(12) United States Patent
Ho et al.

(10) Patent No.: US 7,664,191 B2
(45) Date of Patent: Feb. 16, 2010

(54) METHOD OF SYMBOL DETECTION FOR MIMO DUAL-SIGNALING UPLINK CDMA SYSTEMS

(75) Inventors: Chung-Lien Ho, Zhongli (TW); Jwo-Yuh Wu, Hsinchu (TW); Ta-Sung Lee, Hsinchu (TW)

(73) Assignee: National Chiao-Tung University, Hsinchu (TW)

( * ) Notice: Subject to any disclaimer, the term of this patent is extended or adjusted under 35 U.S.C. 154(b) by 456 days.

(21) Appl. No.: 11/191,103

(22) Filed: Jul. 27, 2005

(65) Prior Publication Data

US 2006/0268809 A1    Nov. 30, 2006

(30) Foreign Application Priority Data

May 11, 2005 (TW) .............................. 94115211 A

(51) Int. Cl.
H04B 7/02 (2006.01)
(52) U.S. Cl. ..................... 375/267; 455/101; 455/103; 455/501; 455/562.1; 375/299; 375/347
(58) Field of Classification Search .................. 370/310, 370/335, 329, 342, 430, 441, 535; 375/267, 375/299, 347, 324, 349, 316, 346, 144, 148; 455/101, 115.1, 501, 436, 562.1, 114.2
See application file for complete search history.

(56) References Cited

U.S. PATENT DOCUMENTS

| | | | |
|---|---|---|---|
| 7,103,325 B1 * | 9/2006 | Jia et al. ..................... | 455/101 |
| 7,120,395 B2 * | 10/2006 | Tong et al. ................... | 455/101 |
| 7,209,522 B1 * | 4/2007 | Shirali ......................... | 375/285 |
| 2004/0132496 A1 * | 7/2004 | Kim et al. ................... | 455/562.1 |
| 2006/0035639 A1 * | 2/2006 | Etemad et al. .............. | 455/436 |

OTHER PUBLICATIONS

G.D. Golden, G.J. Foschini, et al, "Detection Algorithm and Initial Laboratory Results Using V-BLAST Space-Time Communication Architecture" Electronics Letters vol. 35, No. 1, pp. 14-16, Jan. 1999.

Vahid Tarokh, Hamid Jafarkhani et al, "Space-Time Block Codes from Orthogonal Designs" IEEE Transactions on Information Theory, vol. 45, No. 5, pp. 1456-1467, Jul. 1999.

Ayman Naguib, Nambi Seshadri, et al, "Applications of Space-Time Block Codes and Interference Suppression for High Capacity and High Data Rate Wireless Systems" Proc. $32^{nd}$ Asilomar Conf. Signals, Systems, and Computers, vol. 2, pp. 1803-1810 AT&T Labs, NJ, USA, IEEE 1998.

(Continued)

Primary Examiner—Dwayne Bost
Assistant Examiner—Inder P Mehra
(74) Attorney, Agent, or Firm—Bucknam and Archer

(57) ABSTRACT

The invention provides a block-wise successive interference cancellation (SIC) detection algorithm for a general multi-input multi-output (MIMO) CDMA system over the frequency-selective channels, in which each user's data stream can be simultaneously applied with orthogonal space-time block encoding for transmit diversity or spatially multiplexing for high spectral efficiency according to the channel conditions. For such the considered dual-signaling system, the receiver could suffer from the large dimension data processing. A two-stage approach for block-wise SIC detection algorithm is thus proposed to further reduce the computational complexity.

2 Claims, 3 Drawing Sheets

OTHER PUBLICATIONS

V. Tarokh, A. Naguib, et al "Combined Array Processing and Space-Time Coding" IEEE Trans. Inform. Theory, vol. 45, No. 4, pp. 1121-1128, May 1999.

A. Stamoulis, N. Al-Dhahir, et al "Further Results on Interference Cancellation and Space-Time Block Codes" Proc. $35^{th}$ Asilomar Conf. Signals, Systems, and Computers, vol. 1, pp. 257-261, 2001.

* cited by examiner

METHOD OF SYMBOL DETECTION FOR MIMO DUAL-SIGNALING UPLINK CDMA SYSTEMS

CROSS REFERENCE TO RELATED APPLICATIONS

This application claims priority under 35 U.S.C. §119 of Taiwanese Patent Application No. 094115211 dated May 11, 2005 the disclosure of which is hereby incorporated by reference.

FIELD OF THE INVENTION

This invention relates to communication systems and, more particularly to the multi-input multi-output (MIMO) communication systems.

BACKGROUND OF THE INVENTION

Several prior techniques have been developed to process and deal with the MIMO communication system including:

(1) In MIMO systems, it is known that high spectral efficiency and high quality can be achieved by exploiting the spatial multiplexing (SM) scheme '[G. D. Golden, G. J. Foschini, R. A. Valenzuela, and P. W. Wolniansky, "Detection algorithm and initial laboratory results using V-BLAST space-time communication structure," *Electronic Letters*, vol. 35, no. 1, pp. 14-161, January 1999] (hereafter referred to as REF. 1) and space-time coding (STC) [V. Tarokh, H. Jafarkhani, and A. R. Calderbank, "Space-time block codes from orthogonal designs," *IEEE Trans. Inform. Theory*, vol. 45, no. 7, pp. 1456-1467, July 1999] (hereafter referred to as REF. 2) scheme, respectively. Such schemes can be directly applied to the multiuser (MU) systems yielding an MU SM system or an MU STC system. However, whenever in which the system, the data streams of all the users must be transmitted under the same mode and cannot be switched. This is very inflexible and cannot achieve the best performance for a general system link requirement and/or wide channel conditions.

(2) Naguib's 2-step Method [A. F. Naguib, N. Seshadri, and A. R. Calderbank, "Applications of space-time block codes and interference suppression for high capacity and high data rate wireless systems," *Proc. 32th Asilomar Conf. Signals, Systems, and Computers*, vol. 2, pp. 1803-1810, 1998] (hereafter referred to as REF. 3) can be directly implemented an MU STBC system. In this scenario, the overall detection framework can be simply regarded as a parallel interference cancellation (PIC) scheme followed by a local ML search. In such a processing, the signal detection thus cannot enjoy the increased receive diversity gain through the PIC step. On the other hand, this method is based on the ML metric to decide the optimal detection order. This may achieve better detection performance but, however, attain a large computational cost.

(3) The method proposed in [V. Tarokh, A. Naguib, N. Seshadri, and A. R. Calderbank, "Combined array processing and space-time coding," *IEEE Trans. Inform. Theory*, vol. 45, no. 4, pp. 1121-1128, May 1999] (hereafter referred to as REF. 4) applies the BLAST algorithm for signal detection followed by an ML search in single user (SU) systems. However, the algorithm is mainly based on the space-time trellis codes, and do not exploit the codeword's algebraic structures for decoding.

(4) in the Stamoulis's method [A. Stamoulis, N. Al-Dhahir, and A. R. Calderbank, "Further results on interference cancellation and space-time block codes," *Proc. 35th Asilomar Conf Signals, Systems, and Computers*, vol. 1, pp. 257-261, 2001] (hereafter referred to as REF. 5) is a pure interference cancellation scheme through appropriate linear transformation based on the algebraic structure of orthogonal based space-time block coding (O-STBC) to decouple a user's data stream one at a time over the MU STBC systems. At each stage, there are no increased degrees-of-freedom that can be retained after the interference cancellation step for further interference suppression/signal detection at the next stage. This causes that it cannot enjoy the increase in receive diversity as the algorithm goes on, even if it is combined with some power ordering strategy.

SUMMARY OF THE INVENTION

We propose a group SIC detection algorithm for a general MIMO CDMA systems, in which each user's data stream can be either orthogonal space-time block encoded for transmit diversity or spatially multiplexed for high spectral efficiency according to the channel conditions.

Based on the rich and distinctive structures imbedded in the resulting channel matrix, we derive a well-performance and computationally efficient detector. The algorithm can be described as:

(1) A flexible MIMO transceiver is suggested for uplink CDMA systems over the frequency-selective channels as depicted in FIG. 1.

(2) The data streams transmitted form each mobile terminal can be either spatial multiplexed (e.g., vertical Bell laboratories layered space-time, V-BLAST) for achieving high data rate or orthogonal space-time block encoded (e.g., orthogonal space-time block code, O-STBC) for transmit diversity.

(3) At the base station, the received data is despread, linearly combined with the channel matrix followed by an ordered successive interference cancellation (SIC) algorithm to detect the transmitted symbols from each mobile terminal.

(4) For such the considered dual-signaling system, the receiver could suffer from the large dimension data processing. However, based on the algebraic structure of the O-STBCs and through judiciously exploiting it, it can be shown that an attractive block-wise implementation of the SIC algorithm can be achieved to restore the algorithm complexity back.

(5) The imbedded algebraic structure resulting in the channel matrix is further exploited for developing a low-complexity recursive-based detector. It is shown that the calculation of the weights of the V-BLAST detection at each iteration is not computed but rather directly obtained from the information at the previous iteration without any matrix inversion.

(6) To solve the time delay problem caused by STBC signal, this invention proposes a 2-stage group SIC detection algorithm in the dual signaling system, and this can reduce the computational complexity.

(7) The proposed flexible MIMO transceiver can be applied to the B3G high-speed uplink communications.

| | Symbol Notations: |
|---|---|
| 1 | de-multiplexer |
| 2 | space-time encoder |
| 3 | spread spectrum code |
| 4 | spread spectrum decoder and diversity combiner (using $H_c$ for linear combining) |
| 5 | block-wise SIC detector |
| 6 | multiplexer |
| 7 | orthogonal matrix |
| 8 | implementation of low complexity detection algorithm ($1^{st}$ iteration) |
| 9 | implementation of low complexity detection algorithm ($2^{nd}$ iteration) |
| 10 | implementation of low complexity detection algorithm ($L^{th}$ iteration) |
| M | mobile station |
| S | base station |
| TD | transmitted multi-users' data stream |
| MD | multi-input multi-output channel matrix H |
| DD | detected multi-users' data stream |

DETAILED DESCRIPTION OF THE PREFERRED EMBODIMENT

A preferred embodiment of this invention is to be described as the following:

I • System Modeling

A. System Descriptions and Basic Assumptions

Figure 1:
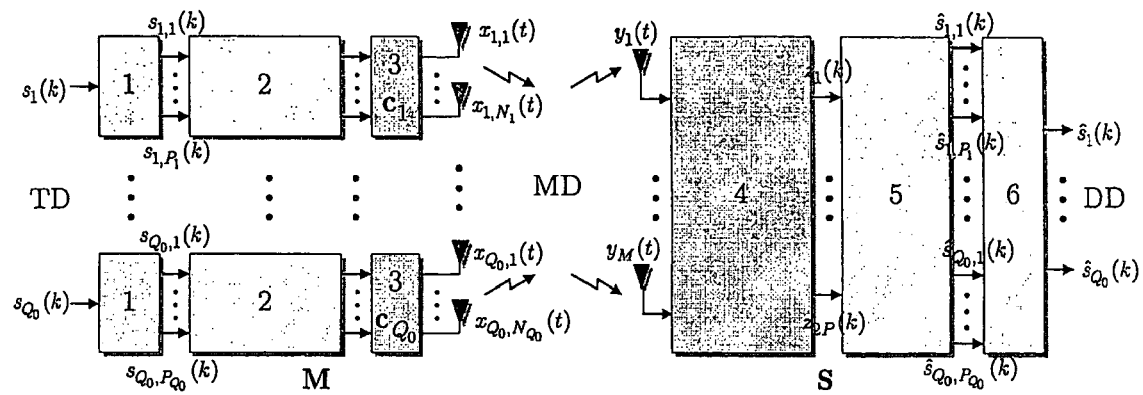
FIG. 1 shows the proposed receiver-transmitter configuration of this invention, in which a dual-signaling transmitter and a block-wise SIC detector is proposed.

Consider an MIMO uplink CDMA system over the frequency-selective multipath fading channels, as shown in FIG. 1, in which each of Q user terminals is allocated with N transmission antennas. The data stream of the $q^{th}$ user $s_q(k)$, where $1 \leq q \leq Q$, can be transmitted by using spatial multiplexing (SM), or space time block coding (STBC). Suppose $S_D$ and $S_M$ represent the set of the user terminals which use STBC and SM respectively, and $Q_D := |S_D|$ and $Q_M := |S_M|$ represent the corresponding number of users. Based on the proposal in the article of [V. Tarokh, H. Jafarkhani, and A. R. Calderbank, "Space-time block codes from orthogonal designs," *IEEE Trans. Inform. Theory*, vol. 45, no. 7, pp. 1456-1467, July 1999], for consecutive p symbols in the data stream of each STBC terminal, are spatially and temporally encoded, and then are transmitted across N antennas over K-symbol intervals. At the same signal interval, each SM user then transmits NK independent symbols. Hence, the total numbers of data symbols transmitted by Q users in K symbol intervals can be represented as follows:

$$L_T := PQ_D + NKQ_M \quad (1)$$

Concretely speaking, these two space-time signal transmission mechanisms can be completely described by of the associated N×K space-time codeword matrix. In this invention, the $q^{th}$ user's data stream $s_q(k)$ can be split into groups of sub-data streams as $s_{q,l}(k) := s_q(L_q k + l - 1)$, where $1 \leq l \leq L_q$, and $L_q$ is the number of sub-data streams transmitted by the $q^{th}$ user, which depends on the signaling mode. When a user using STBC for transmitting, i.e., $q \in S_D$, then $L_q = P$; and when a user using SM for transmitting, i.e., $q \in S_M$, then $L_q = NK$. Hence, the space-time codeword matrix of the $q^{th}$ user can be represented as:

$$X_q(k) := \sum_{l=1}^{2L_q} A_{q,l} \tilde{s}_{q,l}(k), \quad (2)$$

Wherein $A_{q,l} \in \mathbb{C}^{N \times K}$ is a space-time modulation matrix. For $q \in S_D$, based on REF. 2, $A_{q,l}$ possess the following characteristics: (1) $A_{q,l} A_{q,l}^H = I_N$ when k=l and (2) $A_{q,k} A_{q,l}^H + A_{q,l} A_{q,k}^H = O_N$ when k≠l, $q \in S_D$. Besides, $\tilde{s}_{q,l}(k) := \text{Re}\{s_{q,l}(k)\}$ when $1 \leq l \leq L_q$, and $\tilde{s}_{q,l}(k) := \text{Im}\{s_{q,l-L_q}(k)\}$ when $L_q + 1 \leq l \leq 2L_q$. Next, the space-time coded data streams of each user are spread using spreading code and transmitted from N antennas through a frequency-selective fading channel with $L_c$ resolvable paths.

Suppose that the receiving end uses M ($\geq$N) antennas. Define $y(k) \in \mathbb{C}^{M(G+L_c-1)}$ be the received chip-sampled space-time data vector at the $k^{th}$ symbol period, where G is a Spreading Factor. Due to the time latency caused by STBC transmission signal, the inventors collecting y(k) during the interval of K consecutive symbols yields the following space-time data matrix (suppose Q users are symbol synchronized).

$$Y(k) := [y(k) \ldots y(k+K-1)] = \sum_{q=1}^{Q} H_q X_q(k) + V(k), \quad (3)$$

wherein $H_q \in \mathbb{C}^{M(G+L_c-1) \times N}$ is the MIMO channel matrix from $q^{th}$ user to receiving end, and $H_q$ includes the effect of spread spectrum code, and is static and constant during the interval of K consecutive symbols. And wherein $V(k) \in \mathbb{C}^{M(G+L_c-1) \times K}$ is the matrix of the channel noise matrix. Here, the inventors assume:

(A1) The symbol data stream $s_q(k)$, for $1 \leq q \leq Q$ are i.i.d with zero mean and variance is $\sigma_s^2$.

(A2) Each element of noise V(k) is spatially and temporally white with zero mean and variance $\sigma_v^2$.

(A 3) Suppose that at least one user's data is transmitted by STBC mode, and hence $Q_D \geq 1$.

(A 4) Suppose N≤4, hence the length of symbol block is P∈{2,4}, based on REF 2.

B. Vectorized Signal Model

To facilitate the detection process and analysis based on the matrix linear model (3), the inventors propose to use an equivalent vectorized linear model. Suppose $s_q(k) := [s_{q,l}(k), \ldots, s_{q,L_q}(k)]^T$ is the transmission symbol block of the $q^{th}$ user. Without loss of generality, the inventors re-number the NK symbols $s_{q,l}(k)$ of each SM user (i.e., $q \in S_M$), so that the $n^{th}$ data group $s_{q,l}(k)$ of $K^{th}$ symbol, for $(n-1)K+1 \leq l \leq nK$, can be transmitted from the $n^{th}$ antenna. Define $\tilde{s}_q(k) := [\text{Re}\{s_q^T(k)\} \text{Im}\{s_q^T(k)\}]^T \in \mathbb{R}^{2L_q}$ and $\tilde{y}(k) := [\text{Re}\{y^T(k)\} \text{Im}\{y^T(k)\}]^T \in \mathbb{R}^{2M}$ be the split real-valued symbol block of the $q^{th}$ user and received signal vector, respectively. Hence, the complex-valued matrix model (3) can be re-written as following an equivalent real-valued vector model $$y_c(k) := [\tilde{y}^T(k) \ldots \tilde{y}^T(k+K-1)]^T = H_c s_c(k) + v_c(k), \quad (4)$$

Where $H_c \in \mathbb{C}^{2KM(G+Lcl) \times 2LT}$ is the equivalent overall (Q users) MIMO channel matrix, $$s_c(k) := [\tilde{s}_1^T(k) \ldots \tilde{s}_Q^T(k)]^T \in \mathbb{R}^{2L_T}, \quad (5)$$

is the symbol vector transmitted by all user terminals, $v_c(k)$ is the resulting noise item. Through dispreading and linearly combing for $y_c(k)$ with channel matrix $H_c$, a Matched-Filtered (MF) data vector can be obtained as follows.

$$z(k):=H_c^T y_c(k)=Fs_c(k)+\bar{v}(k), \quad (6)$$

wherein $$F:=H_c^T H_c \in \mathbb{R}^{2LT \times 2LT}, \quad (7)$$

and $\bar{v}(k):=H_c^T v_c(k)$. With these results, the symbol detection can be realized based on model (7). To make the core ideas of this invention more clear, throughout the context the inventor will focus on the real-valued constellation case with unit-rate codes, and hence P=K so that $L_T=PQ_D+PNQ_M$. Essentially the same results are also used for complex-valued constellations (possibly with half-rate codes for STBC users).

II • Matched Filter Channel Matrix

After the descriptions in this section, it will be found that the F matrix have an appealing structure. To characterize the structure of F, the inventors collect the all elements in F first, and then put them all together to examine how F is actually like. Based on the characteristics of a channel, the data stream of each user can be processed by STBC to obtain the transmit diversity, or by SM to obtain high spectrum efficiency. This leads to two signal prototypes, one for a particular signaling. Besides, among all interference signatures, there are three distinct canonical building blocks need to be identified: two of which reflect the "intra-class" interference between each pair of distinct SM or STBC users, and the other is for the "inter-class" user interference.

To further pin-down these signal prototypes signatures, recall that the numbers of symbols transmitted from an SM and an STBC user terminals transmit are P and NP, respectively, during the consecutive K(=P) symbols. Therefore, if $F_{p,q}$ is a sub-matrix of F, representing the interference signature between the $p^{th}$ and the $q^{th}$ user's data streams, we then have $F_{p,q} \in \mathbb{R}^{P \times P}$ if p, q∈$S_D$, $F_{p,q} \in \mathbb{R}^{NP \times NP}$ if p, q∈$S_M$, and $F_{p,q} \in \mathbb{R}^{P \times NP}$ if p∈$S_D$ and q∈$S_M$. All such three Fp,q's, together with the signal signature Fp,q for either p∈SD or q∈SM, are specified as follows. In the sequel, O(P) is defined as a set of all P×P real orthogonal designs with constant diagonal entries (those sub-matrices, each of which belongs to a scalar multiple of IP, do fall within this category), as described in REF. 2. Suppose that $F_{p,q}$ is the sub-matrix of F, and is used to represent the mutual coupling between the $p^{th}$ and the $q^{th}$ user. Then the following results hold:

(1) When p, q∈$S_D$, then $F_{p,q} \in O(P)$. And $F_{q,q}=\alpha_{qq}I_{P_0}$ (2) When p, q∈$S_M$, then each of P×P sub-matrix of $F_{p,q} \in \mathbb{R}^{NP \times NP}$ is a scalar multiple of $I_P$.

Figure 2:
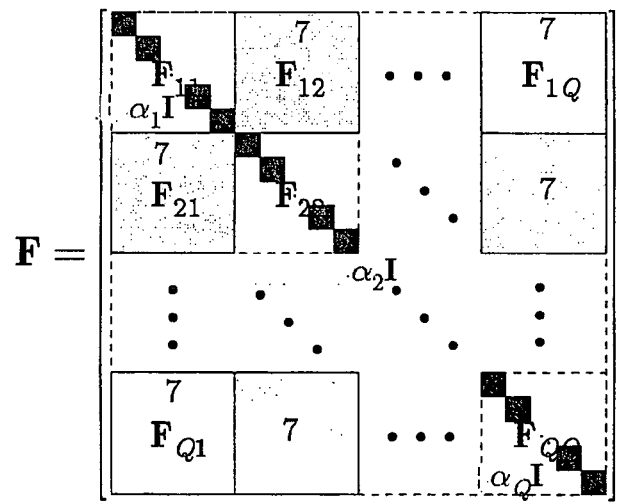
FIG. 2 shows the structure of a matched filter channel matrix F, of this invention.

(3) When p∈$S_D$ and q∈$S_M$, then each of P×P sub-matrix for $F_{p,q} \in \mathbb{R}^{NP \times NP}$ is belong to $O(P)_o$ Some explanations and discussions related to above results are further described in the following (as to the drawings for the matrix structure, see FIG. 2):

(a) Property (1) describes that at a particular situation, the data of all users are modulated for the purpose of obtaining diversity gains. Each P×P diagonal sub-matrix of F is a scalar multiple of $I_P$, but each P×P off-diagonal sub-matrix of F is an orthogonal design.

(b) For p, q∈$S_M$, because SM signals does not impose any spatial and temporal correlations among the transmitted data streams, the interference between two SM data streams transmitted by different antennas will appear to be spatially and temporally decoupled. In particular, it is actually with constant diagonal entries since the respective propagation channels are assumed to be static during K signaling periods.

(c) Property (3) establishes a quite interesting result. The interference from SM data streams potentially retains, rather than wiping off, the orthogonal feature of O-STBC signals. A rough yet heuristic justification of this result is seen by noting that a single-antenna SM data streams may interfere with a STBC signal only through the "time" dimension. Because the SM data streams is temporally decoupled, the incurred interference might be likely to render the imbedded temporal correlation of STBC data streams unchanged. Therefore the resultant interference signatures still appear as orthogonal type matrices. This good property also holds for the single-antenna transmission in above the proposed dual-signal systems since, in this case, such a user can be regarded as a single-antenna SM data stream.

For the complex-valued constellations, there are analogue results as above descriptions, with merely possible modifications of matrix dimensions. The results are summarized in Table 1, wherein the matrix $A^{(i,j)}$ is the $(i,j)^{th}$ sub-matrix A with proper matrix dimension.

TABLE 1

Summary of the structure of complex-valued matched-filtered cross-coupling matrix $F_{p,q}$
Complex-Valued Constellation

| | N = 2 (K = 2) | N = 3 or 4 (K = 8) |
|---|---|---|
| p, q ∈ $S_D$ | p = q : $F_{q,q} = \alpha_q I_4$<br>p ≠ q : $F_{p,q} \in O(4)$ | p = q : $F_{q,q} = \alpha_q I_8$<br>p ≠ q : $F_{p,q} \in U(8)$<br>where $U^{(1,1)}(8) = U^{(2,2)}(8) \in O(4)$<br>$U^{(1,2)}(8) = U^{(2,1)}(8) = O_4$ |
| p, q ∈ $S_M$ | p = q : $F_{q,q} = \mathbb{R}^{8 \times 8}$<br>$F_{q,q}^{(n,n)} = \alpha_{q,1} I_4$<br>$F_{q,q}^{(n,d)} \in V(4), 1 \le n, d \le 2$<br>p ≠ q : $F_{p,q} = \mathbb{R}^{8 \times 8}$<br>$F_{p,q}^{(n,d)} \in V(4), 1 \le n, d \le 2$<br>where $V^{(1,1)}(4) = V^{(2,2)}(4) = c_1 I_2$<br>$V^{(1,2)}(4) = -V^{(2,1)}(4) = c_2 I_2$ | p = q : $F_{q,q} = \mathbb{R}^{16N \times 16N}$<br>$F_{q,q}^{(n,n)} = \alpha_{q,1} I_{16}$<br>$F_{q,q}^{(n,d)} \in V(16), 1 \le n, d \le N$<br>p ≠ q : $F_{p,q} = \mathbb{R}^{16N \times 16N}$<br>$F_{p,q}^{(n,d)} \in V(16), 1 \le n, d \le N$<br>where $V^{(1,1)}(16) = V^{(2,2)}(16) = c_1 I_8$<br>$V^{(1,2)}(16) = -V^{(2,1)}(16) = c_2 I_8$ |

TABLE 1-continued

Summary of the structure of complex-valued
matched-filtered cross-coupling matrix $F_{p,q}$
Complex-Valued Constellation

| N = 2 (K = 2) | N = 3 or 4 (K = 8) |
|---|---|
| $p \in S_D$ <br> $q \in S_M$ <br> $F_{p,q} \in R^{4 \times 8}$ <br> $F_{p,q}^{(l,n)} \in O(4), 1 \le n \le 2$ | $F_{p,q} \in R^{8 \times 16N}$ <br> $F_{p,q}^{(l,n)} \in D(8, 16), 1 \le n \le N$, where <br> $D^{(1,1)}(8, 16) = D^{(1,2)}(8, 16) = D^{(2,3)}(8, 16)$ <br> $= -D^{(2,4)}(8, 16) \in O(4)$ <br> $-D^{(2,1)}(8, 16) = D^{(2,2)}(8, 16) = D^{(1,3)}(8, 16)$ <br> $= D^{(1,4)}(8, 16) \in O(4)$ |

III • Block-Wise SIC SYMBOL DETECTION

In order to separate the cross-coupled symbol data stream from equation (6), this invention proposes to adopt the SIC algorithm, based on (see REF. 1). It is known that in case of all SM signaling (i.e., $Q_D$=0), it is natural to perform the conventional one symbol per-layer (symbol-wise) SIC detection technique based on REF. 1. In this case, only $L_T$=$NQ_M$ sub-data streams in z(k) will need to be detected. With a few STBC users presented leading to dual-mode signaling, due to the inherent time latency for symbol detection so as to exploit the diversity benefit for those STBC users, the receiver will receive more independent data symbols and the total $L_T$=P ($Q_D$+$NQ_M$) sub-data streams in z(k) will thus need to be detected. This leads to the receiver suffering from a related large dimension data processing and there will be an unavoidable increase in the detection complexity. However through judiciously exploiting the sophisticated usage of the algebraic structure of O-STBC, it turns out that the corresponding SIC detector can be implemented in a block-wise manner. That is, in each SIC iteration, a block of P symbols, transmitted either from a particular STBC user or from an antenna of an SM user, can be "jointly" detected. As a result, only $Q_D$+$NQ_M$ iterations are needed to detect all P($Q_D$+$NQ_M$) transmitted symbols, it is only needs $Q_D$+$NQ_M$ iteration calculations, and this can actually restore the algorithm's complexity back.

Zero-Forcing Law (ZF Criterion): The inventors shall first consider the Zero-Forcing (ZF) based SIC detection algorithm, in which the optimum detection order at each iteration is found based on the maximum SNR criterion, based on REF. 1. At the initial stage, the ZF decision vector is $F^{-1}z(k)$ and from (6), is obtained as:

$$s_d(k) := F^{-1}z(k) = s_c(k) + F^{-1}\bar{v}(k). \tag{8}$$

Equation (8) shows that, for $1 \le l \le L_T$, the $l^{th}$ symbol decision statistics, that is, the $l^{th}$ element of $s_d(k)$ is simply the desired symbol contaminated by an additive noise $e_l^T F^{-1}\bar{v}(k)$, where $e_l$ is the $l^{th}$ unit-standard vector of $\mathbb{R}^{L_T}$. It is straightforward to verify that the noise power is:

$$E\{|e_l^T F^{-1}\bar{v}(k)|^2\} = \frac{\sigma_v^2}{2} e_l^T F^{-1} e_l. \tag{9}$$

Because all transmission symbols have the same variance, equation (9) means that the (average) SNR of $l^{th}$ decision channel can be completely determined by $[F^{-1}]_{l,l}$, the $l^{th}$ diagonal element of the noise covariance matrix $F^{-1}$. Smal $[F^{-1}]_{l,l}$ implies large SNR in the $l^{th}$ channel noise, and hence better detection accuracy the $l^{th}$ symbol decision statistics to yield. As a result, the optimum detection order at the initial state is obtained by searching for the index $1 \le l \le L_T$ at which $[F^{-1}]_{l,l}$ is minimal. The determination of the optimal index requires the explicit knowledge of diagonal elements of $F^{-1}$.

Under the situation of a fixed parameter P, the inventors define $\mathcal{F}(L)$. as the set of all invertible real symmetric PL×PL matrices, so that for $X \in \mathcal{F}(L)^*$ we get the following results: (i) each P×P block diagonal sub-matrix of X is a (non-zero) scalar multiple $I_P$, (ii) each P×P block off-diagonal sub-matrix of X belongs to $\mathcal{O}(P)$. Besides, denote by $[F^{-1}]_{k,l}$ the $(k,l)^{th}$ P×P block sub-matrix of $F^{-1}$, $1 \le k, 1 \le L$, and L:=$Q_D$+$NQ_M$. Then the inventors can further prove that $[F^{-1}]_{l,l}$= $\beta_{0,l} I_P \bullet$ and $[F^{-1}]_{k,l} \in \mathcal{O}(P)$ when k≠l. This result proves that all P($Q_D$+$NQ_M$) diagonal elements of $F^{-1}$ might have $Q_D$+$NQ_M$ different levels. A block of P symbols can thus be simultaneously detected at the initial stage, with the optimal detection order being given by $$\bar{l}_0 = \arg\min_l \beta_{0,l}.$$

Besides, the ZF weight matrix can be calculated from the corresponding indexed columns of $F^{-1}$, as $W_0 = F^{-1}[e_{P(\bar{l}_0-1)+1} \cdots e_{P(\bar{l}_0-1)+P}] \in \mathbb{R}^{L_T \times P}$. The detected user's signal is cancelled from the received signal (4), yielding a "modified" data model for detection at the next stage.

Through the detect-and-cancel process followed by an associated linear combining of the resultant data as in (6), it can be directly verified that, at the $i^{th}$ iteration, $1 \le i \le L-1$, the noise covariance matrix can be written as:

$$F_i^{-1} := (H_{c,i}^T H_{c,i})^{-1} \in \mathbb{R}^{(L_T-iP) \times (L_T-iP)} \tag{10}$$

Where $H_{c,i}$ is obtained from $H_c$ by removing i block(s) of P column (corresponding to the previously detected signals). Since $F_i$ is simply obtained from F by removing the i block(s) of P column and rows, we have:

$$F_i \in \mathcal{F}(L-i), \tag{11}$$

and $$F_i^{-1} \in \mathcal{F}(L-i). \tag{12}$$

Based on the foregoing discussions, the inventors conclude that the block-wise detection can thus be done likewise at each iteration. The corresponding detection order and the weight matrix can be calculated in an analogue way as:

$$\bar{l}_i = \arg \min_{1 \le l \le L-i} \beta_{i,l}, \quad (13)$$

$$W_i = F_i^{-1}[e_{P(\bar{l}_i-1)+1} \cdots e_{P(\bar{l}_i-1)+P}]. \quad (14)$$

It should be noted that, the joint detection of a block of P symbols per iteration benefits uniquely from the use of orthogonal codes (O-STBC). However, it is also noted that, when the number of transmission antennas of the STBC users is greater than four, the appealing block detection property does not hold even if the orthogonal codes are used. This is because that the F has already lost the particular structure mentioned above and, as a consequence, the assertion on the inverse matrix $F^{-1}$ may not be true.

Minimum Mean Square Error (MMSE) Criterion: The MMSE based SIC detector is also capable of per iteration jointly detecting a block of P symbols in essentially the same manner as in the ZF case. Next, the inventors will introduce that the MMSE SIC detector can be also implemented in the same block-wise manner. In the initial stage, the MMSE weight matrix minimizing $E\{\|s_c(k) - W_0^T z(k)\|^2\}$ is obtained as:

$$W_0 = \left[F + \frac{\sigma_v^2}{2} I_{L_T}\right]^{-1}. \quad (15)$$

The $l^{th}$ symbol MSE, that is $E\{|e_l^T[s_c(k) - W_0^T z(k)]|^2\}$, is then computed as:

$$\varepsilon_{0,l} = e_l^T \left[\frac{2}{\sigma_v^2} F + I_{L_T}\right]^{-1} e_l. \quad (16)$$

Because $F \in \mathcal{F}(L)$, it is obvious that $R_0 := [(2/\sigma_v^2)F + I_{L_T}] \in \mathcal{F}(L)$, and so is $R_0^{-1}$. Hence, the block MMSE detection method can be carried out in the initial state. Starting from equation (4) and with per block detection-and-cancel process followed by an associated matched filtering as in (6); it can be checked that, at the $i^{th}$ iteration, the symbol MSEs are calculated as the diagonal elements of $R_i^{-1} := [(2/\sigma_v^2)F_i + I_{(L_T-iP)}]^{-1}$. Since $R_i^{-1} \in \mathcal{F}(L-i)$, this guarantees the block MMSE detection at each iteration.

From Table 1, it can be found that F does consist of orthogonal type block sub-matrices, therefore, the block-wise SIC detection for complex-valued constellation case can similarly be established. By going through essentially the same arguments as what we have done in the real symbol case, we can similarly derive a block based ZF/MMSE SIC detector, in which 2P real symbols are detected for an STBC user and 2K real symbols for an antenna of an SM user per iteration.

IV • Low-Complexity Detector

The major calculation load of the SIC algorithm is the successive matrix intersions throughout all iterations. The inventors will show that how the knowledge of the imbedded structure of F and it's inverse matrix $F^{-1}$, can further help to reduce the calculation load. Specifically, with the special structure of F, there is an efficient way of finding $F^{-1}$ by solving a set of linear equations of relatively small dimensions based on the Cholesky decomposition. Moreover, the inverse matrix required at each iteration can be calculated based on the parameters available in the previous stage.

A. A Efficient Method for Calculating $F^{-1}$ Using the Cholesky Decomposition

Recall that every P×P block sub-matrixs of $F^{-1}$ is (loosely stated) a P×P real orthogonal design. Each such a sub-matrix is completely characterized by p independent variables. It thus suffices to determine, say, its last column, and the rest can be simply obtained through appropriate linear transformations. This a priori structural information shows that the matrix $F^{-1}$ is completely specified by its $(jP)^{th}$ columns, for $1 \le j \le L$. Hence, the calculation of $F^{-1}$ amounts to solving the following linear equation of reduced dimensions:

$$FG = E, \quad (17)$$

Wherein G and E are $L_T \times L$ matrices whose $j^{th}$ columns are the $(jP)^{th}$ columns of $F^{-1}$ and $I_{L_T}$ respectively. To solve for the unknown G based on (17), for the $j^{th}$ column $g_j$ we must have $g_{i,j} = 0$, for $(j-1)P+1 \le i \le jP-1$. This is because these imbedded P−1 consecutive zero entries come from the last column of the $j^{th}$ P×P diagonal sub-block of $F^{-1}$. Only the non-zero entries thus remain to be determined. The Hermitian property of $F^{-1}$ moreover limits the number of the "actual" non-zero unknowns in each $g_j$. It merely calls for the computations of those lying below $g_{jP-1,j}(=0)$. This analysis thus implies that, for the $j^{th}$ column $g_j$ only the last $P(L-j)+1$ entries need to be determined, and there is a decrease in the number of unknowns by an amount P as the index j increases to j+1.

To evidence how the above structural information about G can simplify the process for solving (17), let us first perform the Cholesky factorization on F to obtain $F = LL^T$, where L is an $L_T \times L_T$ lower triangular matrix (also belongs to $\mathcal{F}(L)$). Hence, (17) can be equivalently rewritten as:

$$LL^T g_j = e_j 1 \le j \le L. \quad (18)$$

Because L is a lower triangular matrix, a typical approach to solve (18) for $g_j$ is the forward and back substitutions. Because the unknown elements to be determined in each $g_j$ all lie below the entry $g_{jP-1,j}(=0)$, the forward and back substitution procedures do not have to exhaust all the entries in $g_j$. It simply terminates as long as $g_{jP,j}$ is calculated; and there is need for computing the remaining "upper" entries due to the Hermitian property of $F^{-1}$.

B. The Method of Recursive Calculation of $F^{-1}$

As mentioned above, at the $i^{th}$ iteration, it requires to determine the optimal detection order and the associated ZF weighting matrix. With $F^{-1}$ obtained, in what follows the inventions will show how $F_i^{-1}$ in each iteration can be recursively computed based on $F_{i-1}$ and $F_{i-1}^{-1}$.

From the construction of $H_{c,i}$, the inventors observe that the matrix $F_i = H_{c,i}^T H_{c,i}$ is simply obtained from $F_{i-1}(=H_{c,i-1}^T H_{c,i-1})$ by deleting one block of P columns and the corresponding indexed block of P row. Without loss of generality, it is assumed that the last column and row blocks of $F_{i-1}$ are to be deleted. Otherwise, the inventors can simply permute those to be discarded to the right and bottom ends of $F_{i-1}$ to fit the prescribed form. Then the inventors can thus partition the $F_{i-1}$ as:

$$F_{i-1} := \begin{bmatrix} F_i & B_{i-1} \\ B_{i-1}^T & D_{i-1} \end{bmatrix}, \quad (19)$$

Where $B_{i-1} \in \mathbb{R}^{(L_T-iP) \times P}$ and $D_{i-1} = d_{i-1} I_P$ for some scalar $d_{i-1}$. Denote by $\bar{F}_{i-1}$ the first $(L_T-iP) \times (L_T-iP)$ principle sub-matrix of $F_{i-1}^{-1}$. Then the matrix $\overline{F}_{i-1}$ is thus available from the (i-1)$^{th}$ iteration. Based on $F_{i-1}$ and $\overline{F}_{i-1}$, it can be shown that, after some manipulations, the inventors have the following key result:

$$F_i^{-1} = \overline{F}_{i-1} - c_{i-1}^{-1} \overline{F}_{i-1} B_{i-1} B_{i-1}^T \overline{F}_{i-1}. \quad (20)$$

where $B_{i-1}^T \overline{F}_{i-1} B_{i-1} + d_{i-1} I_P = c_{i-1} I_P$.

Figure 3:
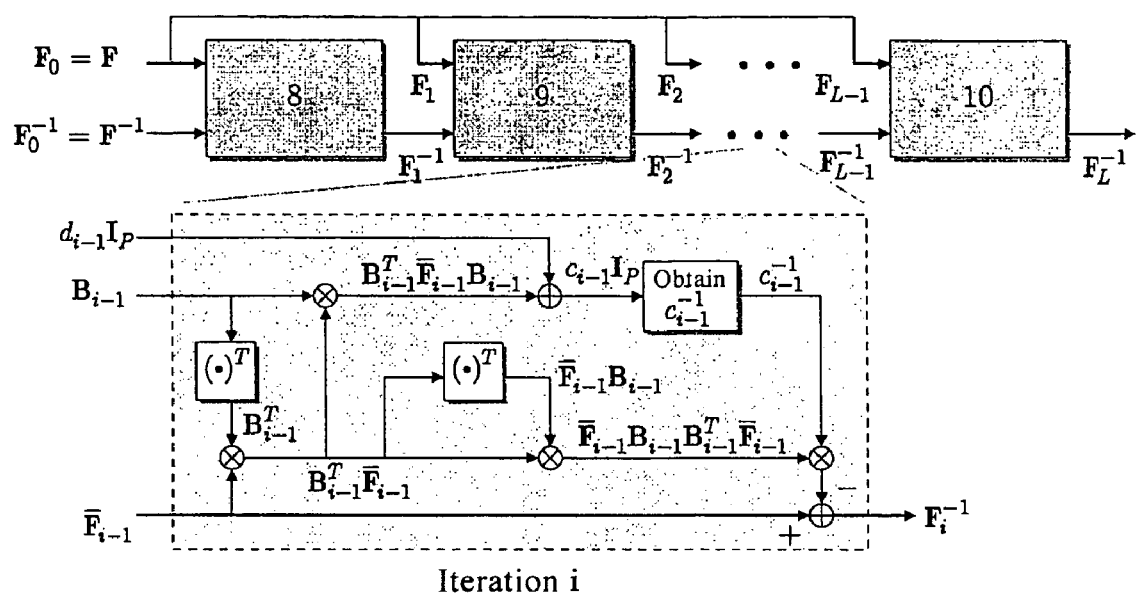
FIG. 3 shows the implementation of the symbol detection based on an iterative block-wise SIC algorithm with low computational complexity, which proposed in this invention.

Equation (20) thus provides a simple recursive formula for calculating $F_i^{-1}$, based on the block of sub-matrices $F_{i-1}$ and $F_{i-1}^{-1}$, without any "direct" matrix inversion operations. The overall low-complexity implementation of $F_i$, for $1 \leq i \leq L-1$, is illustrated in FIG. 3. The above recursive approach for calculating $F_i^{-1}$ can basically be deemed as a block based implementation of the method in ["A fast recursive algorithm for optimum sequential signal detection in a BLAST system," IEEE trans. Signal Processing, vol. 51, no. 7, pp. 1722-1730, July 2003] introduced for the conventional symbol-wise SIC algorithm. A distinctive feature of our scheme, however, is the attractive simplification of (20), by which the computation of the inverse matrix $(B_{i-1}^T \overline{F}_{i-1} B_{i-1} + d_{i-1} I_P)^{-1}$ is completely avoided and all we have to do is to find the scalar $c_{i-1}^{-1}$. Note that to obtain $F_i^{-1}$ through (20), we need some matrix operations, which may be complicated computation. However, based on the rich and distinctive structures of F, it can be shown that the computational complexity can be further reduced.

V • Two-Stage Block-Wise SIC Detection

As mentioned above, as a few STBC users presented, due to the inherent time latency for those STBC users, the receiver could suffer from a large dimension data processing through the conventional symbol-wise SIC algorithm ["A fast recursive algorithm for optimum sequential signal detection in a BLAST system", IEEE trans. Signal Processing, vol. 51, no, 7, pp. 1722-1730, July 2003]. To remedy this, a "two-stage group SIC" detector is proposed to suggest that it could first detect the group of those STBC streams by the block-wise SIC algorithm mentioned above since they may appear to be relatively robust to channel conditions. With this done, by removing the detected STBC streams from the data $y_c(k)$, the SIC algorithm can turn back to the conventional symbol-wise realization for recovering the group of remaining SM streams. However, in this case, the corresponding detection order of the 2-stage group SIC algorithm may not be actually optimal leading to a possible performance loss. It is also noticed that even in the optimal order sorting, the symbol-wise SIC algorithm, in fact, can be done as all the STBC streams have been detected.

VI • Computer Simulation Results

Figure 4:
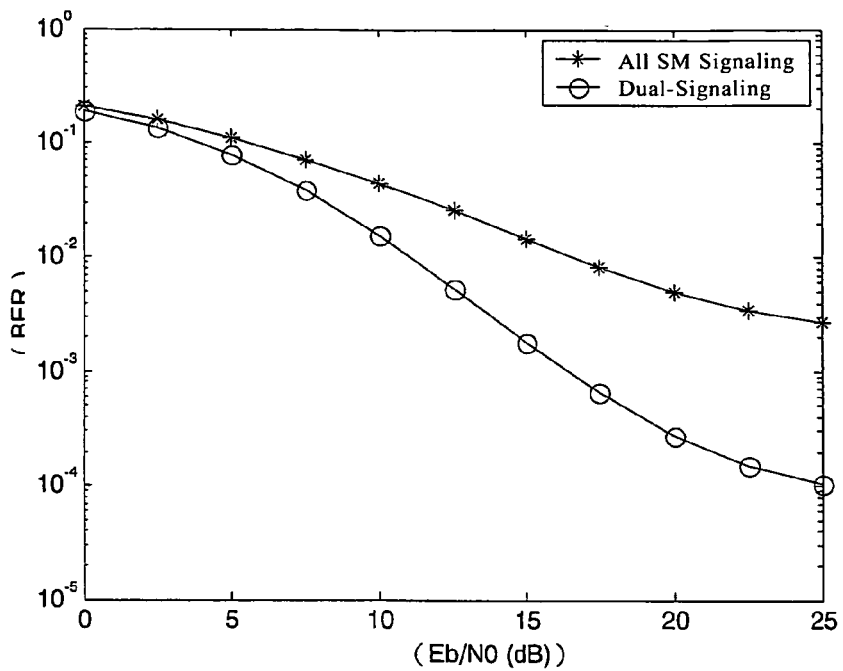
FIG. 4 shows the average bit error rate (BER) of SM transmission and of dual-signaling transmission.

To assess the performance of the dual-signaling scheme, we consider a four-user cellular system specified as follows: 1) two transmit antennas at each handset, 2) two receive antennas at the BS, and 3) the processing gain being 16. Assume that all the four access channels are with a delay spread of five chips; two of them are spatially correlated, in which the direct-path fits the Ricean model with the same κ-factors κ=10, and the others are independent Rayleigh fading. At the BS, the SIC detector with minimum mean square error (MMSE) criterion is used for signal recovery. The mean BER, averaged over all the detected streams, is used as the overall cell performance measure. FIG. 4 shows the performances of the "all SM" signaling and the dual-signaling (Alamouti's code for diversity) strategies. The symbol constellations used are QPSK for SM and 16-QAM for diversity, respectively, so that the data rates are held constant. As one can see, the dual-mode signaling, in particular, the adoption of transmit diversity over correlated channels, does attain higher cell throughput.

Figure 5:
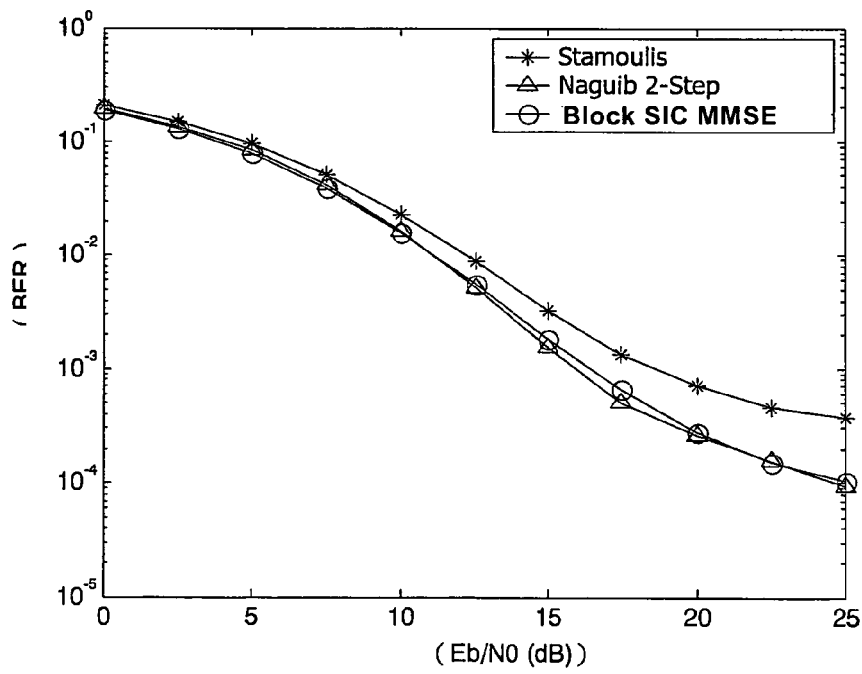
FIG. 5 shows the average bit error rates versus signal/noise ratio (SNR) for three different detection methods in a dual-signaling system over a Ricean multiplex fading channel.

The performance of the proposed block SIC detector is compared with two existing interference cancellation schemes introduced for multiuser space-time coded wireless systems, namely, the Naguib's 2-step approach [REF.3] and the Stamouli's method [REF.5]. For the previously considered four-user platform, FIG. 5 shows the average BER of the three detection methods. As we can see, the SIC based solution and the Naguib's method, which is basically a PIC scheme combined with an ML-based sorting mechanism, attain roughly the same performance. The ML ordering search of the Naguib's method, however, suffers from large computational load, especially when the number of users, or symbol constellation size, is large. The Stamouli's method, which relies on some linear transformation to each time decouple a user's signal from the data for detection, incurs a performance loss. This is because, unlike the proposed SIC solution, in which the involved nulling-and-cancellation procedures can increase the receive diversity order layer after layer, the Stamouli's decoupling-based approach merely retains an identical diversity order for each layer.

What is claimed is:

1. A method of symbol detection for a uplink multi-input multi-output (MIMO) CDMA system that adopts dual-signaling at a transmission end to flexibly switch between transmission diversity and spatial multiplexing based on space-time channel conditions, comprising: based on the channel characteristics, data stream of each user can be simultaneously applied with orthogonal space-time block encoding (O-STBC) for transmission diversity and/or spatial multiplexing (V-BLAST) for high spectral efficiency;

wherein a successive interference cancellation (SIC) algorithm detects data streams by adopting an algebraic structure of the orthogonal space-time block encoding; and the SIC algorithm can be implemented in block-wise, that the data of an STBC terminal or an antenna of an SM terminal can be detected simultaneously at each iteration; and wherein the symbol detection uses a matched filtered channel matrix with a block orthogonal structure to develop a low complexity recursion-based detector; and during the SIC detection, a weight matrix which is required at each iteration is directly obtained from result of a previous iteration, without additional matrix inversion.

2. A method of symbol detection for a uplink multi-input multi-output (MIMO) CDMA system that adopts dual-signaling at a transmission end to flexibly switch between transmission diversity and spatial multiplexing based on space-time channel conditions, comprising: based on the channel characteristics, data stream of each user can be simultaneously applied with orthogonal space-time block encoding (O-STBC) for transmission diversity and/or spatial multiplexing (V-BLAST) for high spectral efficiency;

wherein a successive interference cancellation (SIC) algorithm detects data streams by adopting an algebraic structure of the orthogonal space-time block encoding; and the SIC algorithm can be implemented in block-wise, that the data of an STBC terminal or an antenna of an SM terminal can be detected simultaneously at each iteration; and wherein the symbol detection, to solve a time delay problem caused by space-time block encoding (STBC) signaling, employs a 2-stage group SIC detection algorithm to first detect STBC data streams in block-wise and then detect remaining SM data streams by a conventional symbol-wise SIC algorithm.

* * * * *